July 22, 1930. F. P. RIDDELL 1,771,353
WEED PULLER
Filed July 5, 1928
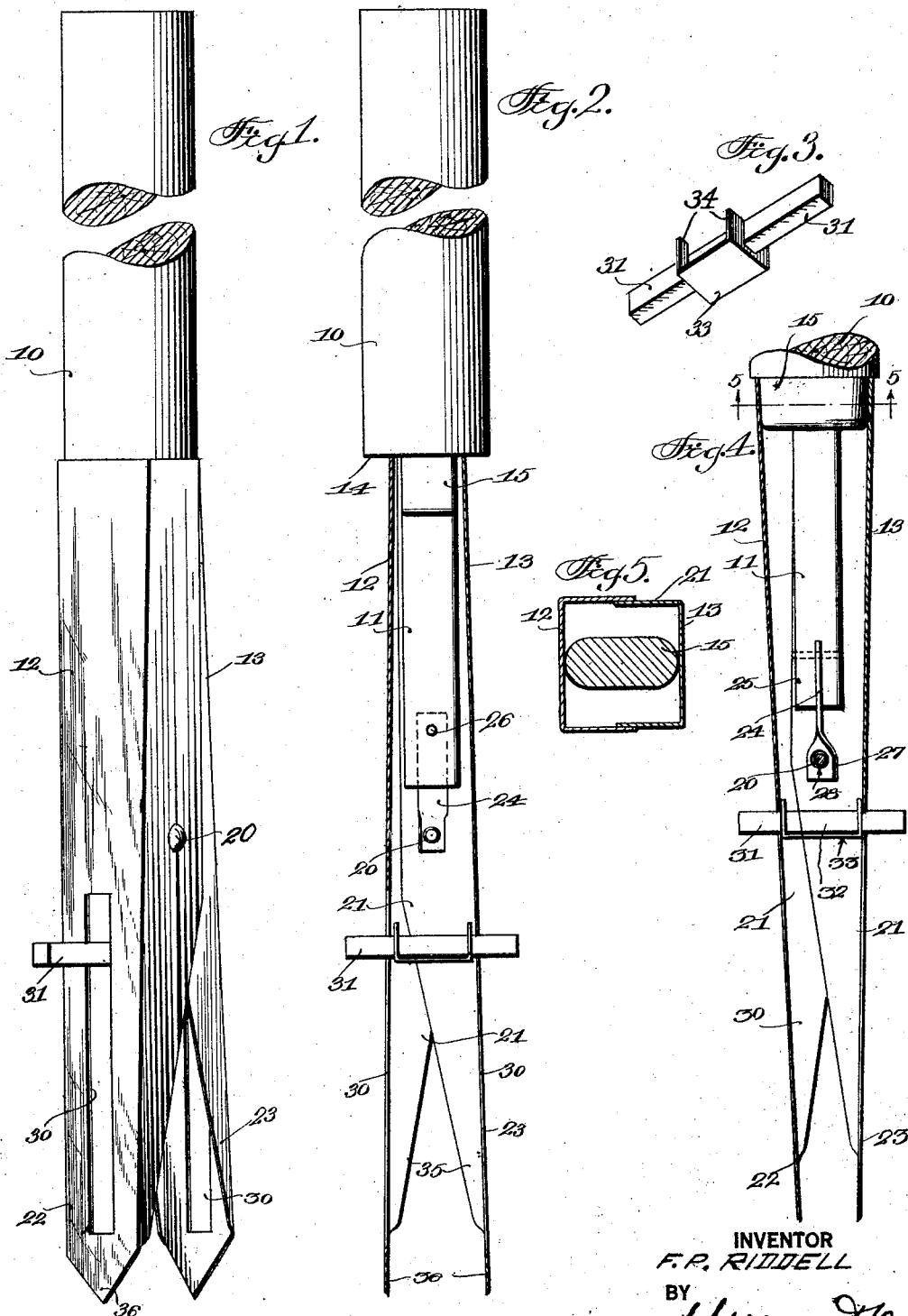
INVENTOR
F. P. RIDDELL
BY
ATTORNEY Patented July 22, 1930

1,771,353

UNITED STATES PATENT OFFICE

FRED P. RIDDELL, OF MOBRIDGE, SOUTH DAKOTA

WEED PULLER

Application filed July 5, 1928. Serial No. 290,623.

This invention relates to a weed puller.

An object of the invention is the provision of a device for readily removing weeds including their roots, with a minimum amount of displacement of the soil.

Another object of the invention is the provision of a weed puller having a pair of pivotally mounted jaws provided with ground penetrating points which are adapted to be moved together in gripping relation with the root by a cam member on a rotatable handle which provides a means for supporting and forcing the jaws into the ground.

A further object of the invention is the provision of a weed puller having a pair of pivotally mounted arms provided with jaws adapted to penetrate the ground upon opposite sides of the root, the jaws being adapted to be operated by a cam member located between the inner free ends of the arms and operated by a supporting handle, means slidably mounted on and between the jaws for forcing the root and dirt from the jaws after the root has been removed.

This invention will be best understood from a consideration of the following detailed description in connection with the accompanying drawings; nevertheless, it is to be understood that the invention is not confined to the disclosure, being susceptible of such changes and modifications as shall define no material departure from the salient features of the invention as expressed in the appended claims.

In the drawings:—

Figure 1 is a view in perspective of the weed remover constructed according to the principles of my invention, Figure 2 is a vertical section of the same, Figure 3 is a view in perspective of a device for removing the roots from between the jaws, Figure 4 is a vertical section similar to that shown in Fig. 2 with the jaws in operative position, Figure 5 is a horizontal section taken along the line 5—5 of Fig. 4.

Referring more particularly to the drawings 10 designates a handle made of any suitable material and provided with a depending portion 11 which is reduced in cross sectional area to be received between the upper free ends of a pair of pivoted arms 12 and 13. The portion 11 forms with the handle 10, a shoulder 14 which is adapted to be engaged by the inner free ends of the arms when the weed remover is operated. The reduced portion adjacent the shoulder 14 is provided with a cam member 15 rigid therewith for forcing the upper ends of the arms 12 and 13 outwardly from each other.

The arms 12 and 13 are pivoted on a bolt 20 which passes through flanges 21 formed on the jaws 22 and 23. A link 24 is received within a bifurcated portion 25 of the depending member 11 and a pin 26 pivotally connects the link to the lower end of the member 11. The lower end of the link is turned at an angle to the main body of the link, as shown at 27, and is provided with a passage 28 to receive a pin 20. It will be noted that the passage 28 is of greater diameter than the pin 20 to permit relative angular oscillating movement of the link on the pin 20. Said pin may be in the form of a bolt having a head at one end and a nut at the other end for maintaining the bolt in position.

The jaws 22 and 23 are provided with slots 30 which receive the projecting arms 31 of a bar 32 which supports a movable cross head 33. The cross head is provided with right angularly disposed flanges 34 to receive the bar 31. Said flange may be either provided with a slot or passage through which extend the arms 31 of the bar 32. The flanges 21 of the jaws 22 and 23 are cut away, as shown at 35, adjacent the ground penetrating points 36. These points of the jaws are sheared off at an angle upon opposite sides to provide the pointed ends 36. The flanges 21 of one jaw overlap the flanges of the cooperating jaw.

The operation of my device is as follows: The jaws are spread apart, as shown in Fig. 1, and placed over and upon opposite sides of the plant. The upper ends of the arms 12 and 13 engage the shoulder 14 so that when the handle 10 is forced downwardly the pressure will be exerted upon the upper ends of the arms and the ground penetrating points 36 may be forced into the ground while the cross head 33 will be moved to its upper limit within the slots 30 of the jaws.

When the jaws have been properly positioned in the ground, the handle 10 is revolved through approximately 90° as shown in Fig. 4, whence the cam member 15 will act on the inner ends of the arms to force the same apart. This action causes the jaws 22 and 23 to be moved toward each other thereby clamping the jaws on the root of the weed. A pull on the handle will remove the weed and a limited amount of soil. When the weed has been removed the fingers 31 of the cross head 33 will be grasped by the hand and the cross head is forced outwardly towards the outer ends of the jaws, thereby removing the weed and soil therefrom. By the angular rotation of the handle 10 the link 24 is likewise slightly revolved and also the looseness of the link on the pin 20 will permit a similar angular motion of said link.

I claim:—

1. A weed puller comprising a pair of pivoted arms having earth penetrating jaws and inner free ends, a rotatable handle supporting the pivoted arms and cam means on the handle engaging the free ends of the arms for forcing the jaws together.

2. A weed puller comprising a pair of pivoted arms having earth penetrating jaws and inner free ends, a rotatable handle supporting the pivoted arms and cam means on the handle engaging the free ends of the arms for forcing the jaws together, the handle having a shoulder engageable with the free ends of the arms for forcing the jaws into the ground.

3. A weed puller comprising a pair of arms pivoted intermediate the ends thereof and having earth penetrating jaws, a rotatable handle having a depending portion received between the arms, a cam member on the handle and located between the inner ends of said arms, a pin for pivotally connecting the arms together, a link connected with the handle and having a loose connection with the pin.

4. A weed puller comprising a pair of arms, pin for pivotally connecting the arms together intermediate the ends thereof, said arms having earth penetrating jaws, a handle having a reduced depending portion disposed between the inner free ends of the arms, said handle being provided with a cam member located between the jaws for forcing the jaws together when the handle is rotated, said depending portion being bifurcated, and a link received within the bifurcated portion and pivoted on said portion, said link having its outer end turned at an angle and provided with a passage to receive the pin, said passage being of a greater diameter than the diameter of the pin.

FRED P. RIDDELL.